(12) United States Patent
Smirnov

(10) Patent No.: US 7,640,078 B2
(45) Date of Patent: Dec. 29, 2009

(54) MULTI-MODE CONTROL ALGORITHM

(75) Inventor: Alexei V. Smirnov, Fort Collins, CO (US)

(73) Assignee: Advanced Energy Industries, Inc., Fort Collins, CO (US)

(*) Notice: Subject to any disclaimer, the term of this patent is extended or adjusted under 35 U.S.C. 154(b) by 324 days.

(21) Appl. No.: 11/481,228

(22) Filed: Jul. 5, 2006

(65) Prior Publication Data

US 2008/0009978 A1    Jan. 10, 2008

(51) Int. Cl.
G05D 7/00 (2006.01)
G05D 11/00 (2006.01)
G05B 13/02 (2006.01)

(52) U.S. Cl. .................. 700/282; 700/40; 700/75; 137/12

(58) Field of Classification Search .......... 700/28, 700/32–34, 40–46, 75–77, 282–285; 137/2–12, 137/14; 73/1.01, 1.16, 1.35, 1.57
See application file for complete search history.

(56) References Cited

U.S. PATENT DOCUMENTS

| | | | | |
|---|---|---|---|---|
| 4,244,340 A | * | 1/1981 | Herth et al. | 123/688 |
| 4,450,680 A | * | 5/1984 | Otsuka et al. | 60/274 |
| 4,538,228 A | * | 8/1985 | Brearey et al. | 701/70 |
| 4,563,991 A | * | 1/1986 | Akatsuka et al. | 123/697 |
| 4,724,865 A | * | 2/1988 | Hirano et al. | 137/486 |
| 4,934,399 A | * | 6/1990 | Cho | 137/14 |
| 5,074,166 A | * | 12/1991 | Yamashita et al. | 477/39 |
| 5,129,418 A | | 7/1992 | Shimomura | |
| 5,410,495 A | | 4/1995 | Ramamurthi | |
| 5,653,210 A | * | 8/1997 | Fischer et al. | 123/501 |
| 5,794,442 A | * | 8/1998 | Lisniansky | 60/414 |
| 6,036,285 A | * | 3/2000 | Murphy | 303/112 |
| 6,155,283 A | | 12/2000 | Hansen et al. | |
| 6,209,521 B1 | * | 4/2001 | Rembold et al. | 123/456 |
| 6,289,923 B1 | | 9/2001 | Ohmi | |
| 6,314,992 B1 | | 11/2001 | Ohmi | |

(Continued)

FOREIGN PATENT DOCUMENTS

WO   WO 03/100391 A1   12/2003

(Continued)

OTHER PUBLICATIONS

CiteSeer—Reinforcement Learning for Mixed Open-Loop Control (1996); from http://citeseer.ist.psu.edu/hansen96reinforcement.html printed May 2, 2006.

(Continued)

*Primary Examiner*—Maria N. Von Buhr
(74) *Attorney, Agent, or Firm*—Neugeboren O'Dowd PC; Sean R. O'Dowd

(57) ABSTRACT

A system and method for controlling a flow of a fluid using a multi-mode control algorithm is described. One embodiment includes a method for changing the multi-mode control algorithm from a closed-loop mode to an open-loop mode. The method includes receiving at least one sensor indicator generated by a sensor. The multi-mode control algorithm is modified from the closed-loop mode to the open-loop mode when, based on the at least one sensor indicator, the threshold condition is satisfied. The multi-mode control algorithm is used by a flow controller to control a flow of a fluid according to a set point.

25 Claims, 4 Drawing Sheets

U.S. PATENT DOCUMENTS

| | | | |
|---|---|---|---|
| 6,415,776 B1 * | 7/2002 | Gates et al. | 123/568.24 |
| 6,445,980 B1 | 9/2002 | Vyers | |
| 6,533,702 B1 * | 3/2003 | Asyama et al. | 477/45 |
| 6,663,349 B1 * | 12/2003 | Discenzo et al. | 417/44.1 |
| 6,712,084 B2 | 3/2004 | Shajii | |
| 6,782,906 B2 | 8/2004 | Chang | |
| 6,807,931 B2 * | 10/2004 | Taylor et al. | 123/90.17 |
| 6,843,122 B2 | 1/2005 | Kim | |
| 6,932,098 B2 | 8/2005 | Shajii | |
| 6,955,072 B2 | 10/2005 | Zarkar | |
| 7,069,944 B2 * | 7/2006 | Morikawa et al. | 137/487.5 |
| 7,216,019 B2 * | 5/2007 | Tinsley et al. | 700/282 |
| 7,283,894 B2 * | 10/2007 | Esposito et al. | 700/282 |
| 7,380,564 B2 * | 6/2008 | Lull et al. | 137/1 |
| 7,434,477 B2 * | 10/2008 | Lull et al. | 73/861 |
| 2001/0032518 A1 | 10/2001 | Boger et al. | |
| 2002/0100462 A1 * | 8/2002 | Yang et al. | 123/568.16 |
| 2004/0074311 A1 | 4/2004 | Lull | |
| 2004/0115491 A1 * | 6/2004 | Cargnelli et al. | 429/13 |
| 2005/0166968 A1 | 8/2005 | Lull | |
| 2005/0167627 A1 | 8/2005 | Lull | |
| 2005/0223813 A1 | 10/2005 | Lull | |
| 2005/0273204 A1 * | 12/2005 | Hansen et al. | 700/282 |
| 2006/0283169 A1 * | 12/2006 | Narayanan et al. | 60/39.24 |
| 2007/0198131 A1 | 8/2007 | Tokuhisa et al. | |

FOREIGN PATENT DOCUMENTS

| | | |
|---|---|---|
| WO | WO 2004/001516 A1 | 12/2003 |
| WO | WO 2004/010234 A2 | 1/2004 |

OTHER PUBLICATIONS

ISA/US, International Search Report and Written Opinion of the International Searching Authority, Sep. 16, 2008, USA.

* cited by examiner

MULTI-MODE CONTROL ALGORITHM

FIELD OF THE INVENTION

The present invention relates to control systems, and in particular, but not by way of limitation, the present invention relates to systems and methods for controlling a flow of a fluid.

BACKGROUND OF THE INVENTION

A closed-loop control algorithm, if properly tuned, can be used to adjust a flow of a fluid in response to changes in fluid flow conditions that cause deviations away from a specified fluid flow set point. Changes in fluid flow conditions are often caused by variations in, for example, pressure, temperature, etc. Deviations away from the specified fluid flow set point caused by these variations are detected and corrected for based on measurements (e.g., feedback signal) generated by a sensing device (e.g., flow sensor measurements from a flow sensor) within a feedback loop of the closed-loop control algorithm.

When fluid flow conditions, however, change rapidly as a result of, for example, rapid pressure changes, sensing devices used by the feedback loop may saturate or produce unreliable feedback signals. If a flow controller, for example, uses these saturated and/or unreliable feedback signals within the closed-loop control algorithm, the flow controller may not deliver the fluid according to the specified fluid flow set point. The flow controller may, for example, over-compensate or under-compensate for changes in fluid flow conditions based on the unreliable feedback signals. Accordingly, a need exists for a method and/or apparatus to provide new and innovative features that address the shortfalls of present methodologies in responding to rapid changes in fluid flow conditions.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

The present invention can provide a system and method for controlling a flow of a fluid using a multi-mode control algorithm. In one embodiment, a method includes receiving at least one sensor indicator generated by a sensor. A multi-mode control algorithm is modified from a closed-loop mode to an open-loop mode when, based on the at least one sensor indicator, a threshold condition is satisfied. The multi-mode control algorithm is used by a flow controller to control a flow of a fluid according to a set point.

In another embodiment, a method includes receiving a pressure measurement of a fluid generated by a pressure sensor. A valve position, which is used to control a flow of a fluid, is calculated based on the pressure measurement when a feedback control loop has been disengaged. The feedback control loop is disengaged when a pressure change of the fluid satisfies a threshold condition.

In another embodiment, an apparatus includes a processor and a memory. The processor is configured to generate a valve position indicator for a valve based on a pressure measurement when a feedback control loop has been disengaged. The valve controls a flow of a fluid in response to the valve position indicator. The feedback control loop is disengaged when a pressure change of the fluid satisfies a threshold condition. The memory is configured to store a mathematical relationship between the valve position, the flow of the fluid, and the pressure measurement that is used by the processor to calculate the valve position.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein

DETAILED DESCRIPTION

In accordance with several embodiments, the present invention is directed to a multi-mode control algorithm that is configured to change from a closed-loop mode (a mode that is based on a closed-loop control algorithm) to an open-loop mode (a mode that is based on an open-loop control algorithm) when a threshold condition is satisfied (e.g., a calculated value falls below or exceeds a threshold value). In many embodiments, the multi-mode control algorithm is configured to change from the closed-loop mode to the open-loop mode when a disturbance(s) such as a sudden pressure change causes unreliable feedback measurements (e.g., parasitic flow) used in a feedback loop of the closed-loop mode. When the disturbance(s) has subsided or after a defined period of time, the multi-mode control algorithm is configured to change from the open-loop mode back to the closed-loop mode.

The threshold condition referenced by the multi-mode control algorithm is defined such that the multi-mode control algorithm changes (e.g., adapts) from the closed-loop mode to the open-loop mode when, for example, values measured by the sensor for the feedback loop of the closed-loop mode are outside of the normal operating range of the sensor and cannot be reasonably relied on within the feedback loop (e.g., near the saturation value of a flow sensor). In some embodiments the threshold condition is related to one or more values that are calculated based on one or more measurements from the sensor. In several embodiments for example, the multi-mode control algorithm is changed from the closed-loop mode to the open-loop mode when a pressure change exceeds a defined threshold condition.

In some embodiments, a flow controller uses a set point indicator and a flow sensor indicator in the feedback loop when the multi-mode control algorithm is in the closed-loop mode to control, for example, a flow of a fluid by adjusting a position of a valve (e.g., variable valve). In many embodiments, the closed-loop mode/closed-loop control algorithm is based on some combination of proportional-integral-derivative (PID) control and the feedback loop is based on a measurement (e.g., flow measurement or flow sensor indicator) from a sensor such as a flow sensor. When the multi-mode control algorithm changes to, for example, the open-loop mode, the control algorithm uses a mathematical relationship to determine the position of the valve to control, for example, the flow of the fluid. In some embodiments, the mathematical relationship is based on, for example, flow/valve sensitivity data characterized during a calibration procedure.

Figure 1:
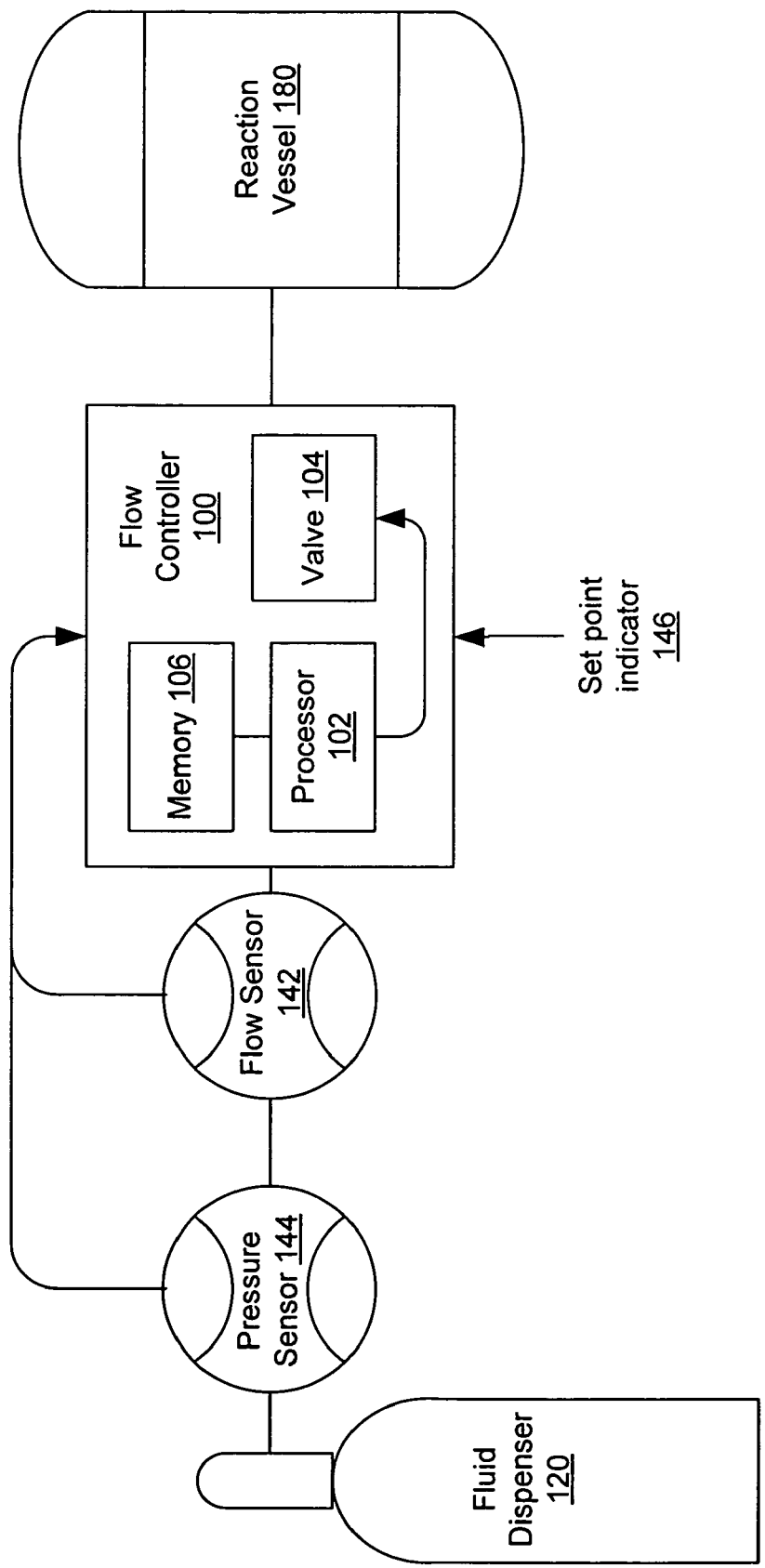
FIG. 1 is a block diagram that illustrates an environment in which a flow controller uses a multi-mode control algorithm to control a flow of a fluid from a fluid dispenser to a reaction vessel, according to an embodiment of the invention.

Referring now to the drawings, FIG. 1 illustrates a flow controller 100 that uses a multi-mode control algorithm to control a flow of a fluid from a fluid dispenser 120 to a reaction vessel 180. The flow controller 100 receives indicators from a flow sensor 142 and a pressure sensor 144 that are upstream from the flow controller 100. The indicator from the flow sensor 142 indicates a flow rate measurement(s) of the fluid flowing from the fluid dispenser 120. The indicator from the pressure sensor 144 indicates a pressure measurement(s) of the fluid from the fluid dispenser 120. The flow controller 100 controls the flow of the fluid according to a set point indicator 146 that indicates a fluid flow set point value. The flow controller 100 in this exemplary embodiment includes a processor 102, a valve 104, and a memory 106 that are used to implement the multi-mode control algorithm and control the flow of the fluid.

In this exemplary embodiment, the flow controller 100 changes the multi-mode control algorithm from a closed-loop mode to an open-loop mode when a rate of pressure change (also referred to as a pressure change rate), calculated based on pressure measurements as indicated by the pressure sensor 144, satisfies (e.g., exceeds) a threshold condition. When a later calculated rate of pressure change, based on pressure measurements from the pressure sensor 144, falls below the threshold condition, the multi-mode control algorithm is changed from the open-loop mode back to the closed-loop mode. When in the closed-loop mode, the flow controller 100 uses the fluid flow set point value and the flow rate measurement in a feedback loop to control the flow of the fluid from the fluid dispenser 120 to the reaction vessel 180. When in the open-loop mode, the flow controller 100 uses an open-loop control algorithm that includes a mathematical relationship based on pressure measurements to control the flow of the fluid.

In some embodiments, the fluid is a liquid (e.g., sulfuric acid) and in other embodiments a gas (e.g., nitrogen), but a person skilled in the art will appreciate, having the benefit of this disclosure, that the fluid being delivered by the flow controller 100 may be any kind of fluid including, for example, a mixture of elements and/or compounds in any phase, such as a gas or a liquid. The multi-mode control algorithm is implemented on a flow controller 100 that, in some embodiments, is a mass flow controller that is configured to deliver a fluid in a gaseous state (e.g., nitrogen) and/or a liquid state (e.g., hydrochloric acid) to, for example, a tool in a semiconductor facility. The flow controller 100 in many embodiments is configured to deliver a fluid under high pressure, low temperature, or to different types of containers or vessels.

The flow sensor 142 in many embodiments is realized by a thermal flow sensor, but in other embodiments a laminar flow sensor, coriolis flow sensor, ultrasonic flow sensor or differential pressure sensor are utilized. The pressure sensor 144 is realized, for example, by a gage pressure sensor, differential sensor, absolute pressure sensor or piezoresistive pressure sensor. In variations, the flow sensor 102 and/or pressure sensor 144 are used in combination with any combination of other sensors (e.g., temperature sensors) to accurately measure the flow of the fluid. These combinations are used, for example, in the feedback loop in the closed-loop mode or in the open loop mode to control fluid flow and/or determine whether to change the multi-mode control algorithm from one mode to another. In some embodiments, the flow controller 100 receives and uses an indicator from another device or sensor such as a temperature sensor (not shown) for determining multi-mode changes and/or to control the flow of the fluid. In several embodiments; one or more of the sensors are located downstream from the flow controller 100 rather than upstream from the flow controller 100.

In the exemplary embodiment depicted in FIG. 1, the flow controller 100 is configured to change the multi-mode control algorithm from the closed-loop mode to the open-loop mode when a pressure change rate, calculated based on pressure measurements as measured by the pressure sensor 144, exceeds (e.g., satisfies) a pressure change threshold measurement/value as defined in a pressure change threshold condition. Because pressure and flow rate are correlated, the threshold condition is defined such that the closed-loop control algorithm within the multi-mode control algorithm is implemented only when the flow sensor 142 is operating in its normal operating range. In other words, the pressure threshold measurement is defined so that the multi-mode control algorithm is changed from the closed-loop mode to the open-loop mode to prevent the feedback loop of the multi-mode control algorithm in the closed-loop mode from using unreliable and/or saturated flow rate measurements from the flow sensor 142. In this embodiment the pressure change threshold condition is defined so that the multi-mode control algorithm is changed from the closed-loop to the open-loop mode at or near the upper boundary of the operating range of the flow sensor 142.

While in the open-loop mode, the mathematical relationship within in the open-loop control algorithm is used to control the flow of the fluid from the fluid dispenser 120 to the reaction vessel 180. The mathematical relationship, in this exemplary embodiment, is based on pressure measurements that are correlated to a valve position for the valve 104. In this embodiment, fluid flow is controlled based on pressure measurements that are correlated to a valve position for the valve 104. As pressure measurements are received, the flow controller 100 uses the mathematical relationship to calculate an appropriate valve position to produce the fluid flow according to the specified fluid flow set point.

In some embodiments, the open-loop mode uses mathematical relationships that are based on other sensor readings in addition to, or in place of, the pressure measurements (e.g., temperature, etc.) and/or knowledge about the system to maintain the flow of the fluid at the specified fluid flow set point. Knowledge about the system is obtained during characterization/calibration processes that includes characterizing and/or calibrating dependences between, for example, flow rate, valve position, pressure, temperature, etc.

When the pressure change rate no longer satisfies the threshold condition by falling below the pressure change threshold value, the multi-mode control algorithm is change from the open-loop mode back to the closed-loop mode. When changing from the open-loop mode to the closed-loop mode, the flow controller 100 uses the fluid flow set point and flow sensor measurements in specified proportions as the feedback signal for the closed-loop algorithm to create a smooth transition from the open-loop mode back to the closed-loop mode. This transition technique (also referred to as a "bumpless" transition) is appropriate when the fluid flow rate is not at, or substantially at, the fluid flow set point after operating for a period of time in the open-loop mode. In some implementations, bumpless transitions techniques are used to change the open-loop mode to the closed-loop mode and vice versa.

The flow controller 100 changes from the closed-loop mode to the open-loop mode, for example, by disengaging the closed-loop control algorithm and engaging the open-loop control algorithm. In some embodiments, engaging the open-loop control algorithm includes eliminating filters and/or constants associated with the closed-loop control algorithm from calculations by, for example, multiplying them by zero. Likewise, when the closed-loop control algorithm is engaged, open-loop control algorithm terms are eliminated, for example, by multiplying them by zero.

In some embodiments, one or more threshold values based on one or more sensor indicators from other sensors (e.g., temperature sensor, flow sensor) are defined in a threshold condition. The one or more threshold values are used, in some implementations, to trigger different modifications to the multi-mode control algorithm. For example, a specified mathematical relationship is used in the open-loop mode when both the pressure change threshold value and a temperature threshold value are exceeded, but a different mathematical relationship is used in the open-loop mode when only the pressure change threshold value is exceeded. In some variations, multiple threshold conditions are defined based on one or more threshold values that are, in some instances, related through mathematical combinations (e.g., added, subtracted, etc.) or Boolean logic.

In several implementations, the changing of the multi-mode control algorithm from the closed-loop mode to the open-loop mode, or vice versa, is based on a timer. For example, the multi-mode control algorithm is changed from the closed-loop mode to the open-loop mode based on the pressure threshold measurement, but changed from the open-loop mode back to the closed-loop mode when a timer expires.

In some implementations, the level of modification and/or mathematical relationships used by the multi-mode control algorithm are based on a magnitude of the pressure change rate relative to the pressure change threshold value within the threshold condition. For example, if the pressure change rate far exceeds the pressure change threshold value, a different mathematical relationship is used in the open-loop mode than would have otherwise been used had the pressure change rate barely satisfied the threshold condition.

As was mentioned earlier, the processor 102, valve 104, and memory 106 within the exemplary flow controller 100 are used to implement the multi-mode control algorithm and control the flow of the fluid from the fluid dispenser 120 to the reaction vessel 180. The memory 106 stores the multi-mode control algorithm, which includes, for example, control algorithms (e.g., PID control algorithms), constants, filter equations, and/or parameters associated with the modes within the multi-mode control algorithm. In this embodiment, the multi-mode control algorithm and associated parameters are biased so that the multi-mode control algorithm is in the closed-loop mode until the pressure change threshold condition is satisfied. The memory 106 is any type of appropriate storage device that can be, but is not limited to, flash memory, a random access memory (RAM) and/or a hard disk.

The memory 106 stores parameters (e.g., time periods) and/or equations (e.g., modification rate change equations) related to the modification of the multi-mode control algorithm. One or more mathematical relationships (e.g., a library of mathematical relationships) used when operating in the open-loop mode are also stored in the memory 106 and accessed by the processor 102. One or more mathematical relationships from a library of mathematical relationships, in some instances, are associated with a specific threshold condition and accessed when the specific threshold condition is satisfied.

Threshold conditions are also stored in the memory 106 and accessed by the processor 102 of the flow controller 100 when necessary. In his embodiment, the memory 106 is configured to store pressure measurement values, flow sensor values, and/or corresponding measurement times that can be accessed by the processor 102.

The processor 102 processes, based on the multi-mode control algorithm, the set point indicator 146, sensor measurements (e.g. pressure sensor measurements, flow sensor measurements), and/or mathematical relationships to control the flow of the fluid from the fluid dispenser 120 to the reaction vessel 180. Specifically, the indicators from the sensors 142 and 144, mathematical relationships, and/or the set point indicator 146 in this embodiment are processed by the processor 102 using the multi-mode control algorithm to control the valve 104 to produce the flow rate specified by the set point indicator 146. When a new set point is received while in the closed-loop mode, as indicated by the set point indicator 146, the flow controller 100 uses the closed-loop control algorithm to adjust the flow rate of the fluid (e.g., via a control indicator sent to the valve 104) to conform with the new set point.

The processor 102 in the exemplary embodiment also calculates pressure change rates based on the pressure measurements received from the pressure sensor 144. The pressure measurements and/or corresponding measurement times can be received directly from the pressure sensor 144 and/or accessed from the memory 106. The processor 102 uses the threshold condition(s) stored in the memory 106 and calculated pressure changes to determine whether the multimode control algorithm should be change from one mode to another (e.g., open-loop mode to closed-loop mode). An absolute value detector module (not shown), in some embodiments, is employed to detect pressure change rates with or in place of, for example, the processor 102.

In this embodiment, the processor 102 is also configured to adjust the constants, filter equations, control algorithms, and/or parameters stored in the memory 106 to change the multi-mode control algorithm from, for example, the closed-loop mode to the open-loop mode when the pressure change threshold condition is satisfied. In some implementations, the processor 102 is designed with, for example, a hardware implemented (e.g., firmware) multi-mode control algorithm that accesses and uses parameters and/or constants stored in the memory 106.

The valve 104 is any appropriate type of valve (e.g., variable valve) that changes the flow of the fluid in any way. For example, in some embodiments the valve 104 is a valve with a variable orifice or a valve with multiple pre-set positions. The flow controller 100 adjusts a position of the valve 104 to control the flow of the fluid from the fluid dispenser 120 to the reaction vessel 180 according to the fluid flow set point as indicated by the set point indicator 146. In this embodiment, the position of the valve 104 is adjusted according to valve position indicators that are based on calculations executed by the processor 102 within the flow controller 100.

Although FIG. 1 shows that the processor 102, valve 104, and memory 106 are integrated into the flow controller 100 in a single device, in some embodiments, the components are combined and/or separated into different components and/or devices. For example, in some embodiments, the memory 106 is embedded into the processor 102 as, for example, a cache, or is integrated into a separate centralized server (not shown) that stores data for the flow controller 100 or for several distributed and/or cascaded flow controllers. The valve 104, in some implementations, is a separate component from the flow controller 100 that is either upstream or downstream from, for example, the flow sensor 142, pressure sensor 144 and/or flow controller 100. In other implementations, the flow sensor 142 and/or pressure sensor 144 is integrated into the flow controller 100. Also, although the processor 102, valve 104, and memory 106 were described in connection with the embodiment described above, a person of skill in the art can appreciate that the components can be adapted to implement many variations of the multi-mode control algorithm.

FIGS. 2A through 2F are graphs that show exemplary measurements, signals, and calculated values related to an exemplary pressure change that triggers an exemplary modification of a multi-mode control algorithm from a closed-loop mode to an open-loop mode. The graphs in FIGS. 2A through 2F show time on their respective x-axes and various measurements and calculated values on their respective y-axes. The multi-mode control algorithm in this embodiment is implemented on a flow controller that is controlling a flow of a fluid through a valve according to a fluid flow set point.

Figure 2A:
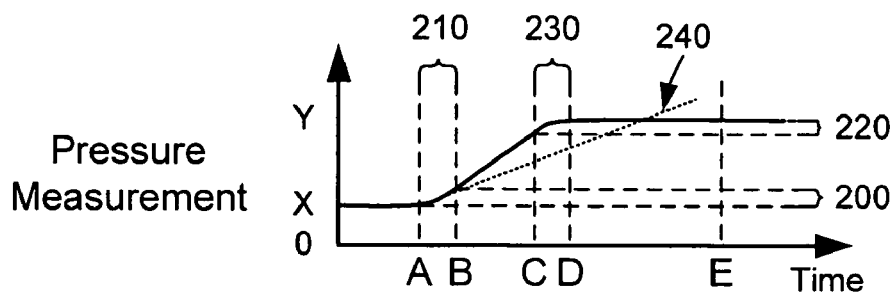
FIG. 2A is a graph that shows a pressure measurement as indicated by a pressure sensor, according to an embodiment of the invention.

FIG. 2A is a graph that shows a pressure measurement as indicated by a pressure sensor indicator from a pressure sensor. FIG. 2A shows a change in pressure from X at time A to Y at time D. FIG. 2A shows that the rate of change of the pressure between times A and C exceeds the threshold pressure change rate threshold value indicated by a slope of line 240. The excessive rate of pressure change with respect to the threshold value was detected at time B based on the pressure change 200 over time period 210. The detection of the excessive rate of pressure change at time B triggers a modification of the multi-mode control algorithm from the closed-loop mode to the open-loop mode. Between times C and D, the pressure change rate (as indicated by the pressure change 220 over time period 230) drops below the threshold pressure change rate indicated by the slope of line 240. As a result, at time D, the multi-mode control algorithm is changed from the open-loop mode back to the closed-loop mode.

In summary, the pressure measurement profile in FIG. 2A shows that the multi-mode control algorithm is in the closed-loop mode before time B, in the open-loop mode between times B and D, and in the closed-loop mode after time D. All of the changes into the various modes are triggered by pressure change rates either exceeding or falling below the threshold pressure rate change threshold value indicated by the slope of line 240.

Figure 2B:
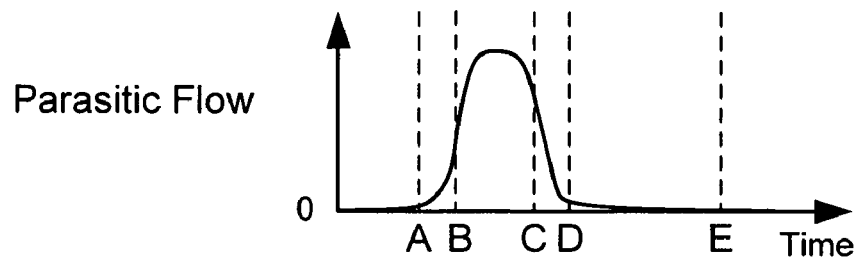
FIG. 2B is a graph that shows a value of a parasitic flow caused by a pressure change, according to an embodiment of the invention.

FIG. 2B is a graph that shows a parasitic flow resulting from the pressure changes shown in FIG. 2A. FIG. 2B shows that at time A the parasitic flow starts to increase when the pressure starts to increase as shown in FIG. 2A. At time B in FIG. 2A, the parasitic flow increases dramatically as the rate of pressure increases as shown in FIG. 2B. At time C, as a result of the rate of pressure change slowing down as shown in FIG. 2A, the parasitic flow in FIG. 2B decreases dramatically until the parasitic flow disappears shortly after time D.

Figure 2C:
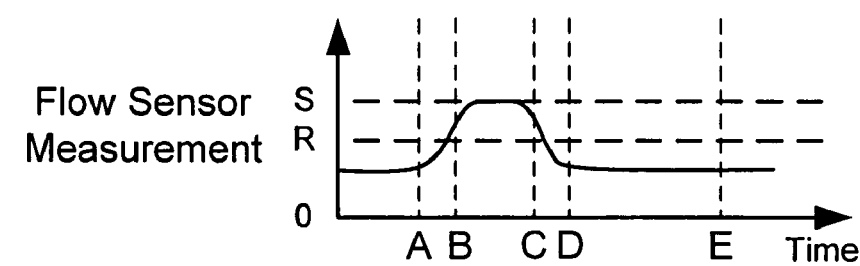
FIG. 2C is a graph that shows a flow sensor measurement from a flow sensor, according to an embodiment of the invention.

FIG. 2C is a graph that shows flow sensor readings/measurements of the flow of the fluid. FIG. 2C includes the parasitic flow shown in FIG. 2B. The operating range of the flow sensor is shown on the graph between flow sensor measurements 0 and R. Flow sensor measurements above flow sensor measurement R on the y-axis are less reliable and the flow sensor saturates at flow sensor measurement S. FIG. 2C shows that the threshold pressure change rate value has been chosen such that at time B, shortly after flow sensor measurements reach the unreliable range, the multi-mode control algorithm is changed to the open-loop mode. FIG. 2C shows that the threshold pressure change rate value has been chosen such that at time D, after flow sensor measurements are back in the specified operating range of the flow sensor, the multi-mode control algorithm is changed from the open-loop mode back to the closed-loop mode.

Figure 2D:
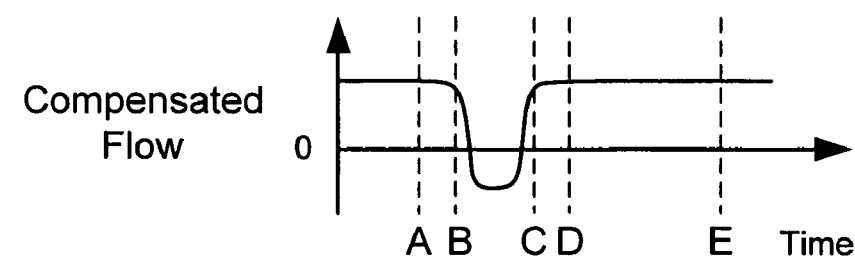
FIG. 2D is a graph that shows a compensated flow in response to a pressure change, according to an embodiment of the invention.

FIG. 2D is a graph that shows compensated flow based on the parasitic flow in FIG. 2B if the open-loop control algorithm associated with the multi-mode control algorithm were not implemented. Without the change from the closed-loop mode to the open-loop mode, FIG. 2D shows that the flow controller would be errantly over-compensated (particularly between times B and C) for the parasitic flow in FIG. 2B that is caused by the pressure change in FIG. 2A.

Figure 2E:
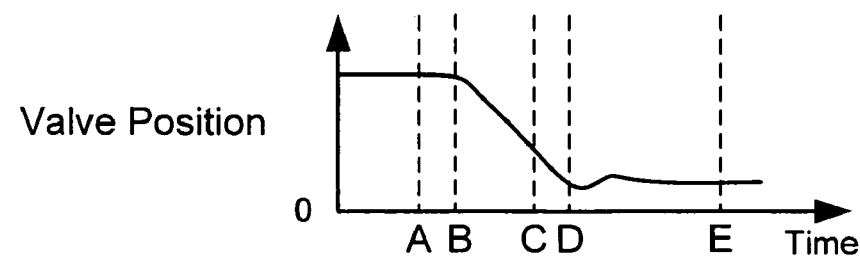
FIG. 2E is a graph that shows a valve position of a valve that is controlled by a flow controller implementing a multi-mode control algorithm, according to an embodiment of the invention.

FIG. 2E is a graph that shows a valve position of the valve that is controlled by the flow controller implementing the multi-mode control algorithm. The valve position is controlled between times B and D based on the open-loop control algorithm according to a mathematical relationship that correlates pressure measurements with valve positions. FIG. 2E shows that when the multi-mode control algorithm is changed from the open-loop mode to the closed-loop mode after time D, in this embodiment, the closed-loop control algorithm corrects for a slight overshoot in valve position when the multi-mode control algorithm operated in the open-loop mode.

Figure 2F:
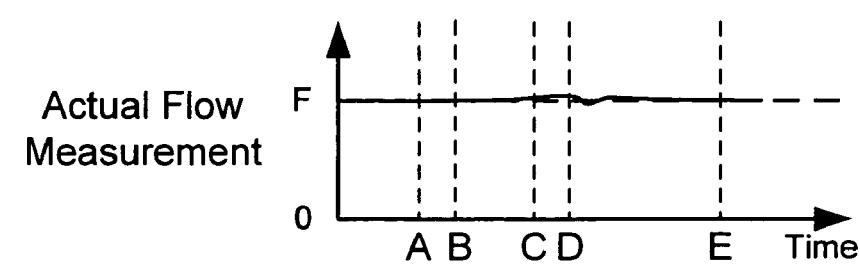
FIG. 2F is a graph that shows an actual flow of a fluid through a valve that is controlled using a multi-mode control algorithm, according to an embodiment of the invention.

FIG. 2F is a graph that shows an actual flow of fluid through the valve that is controlled using the multi-mode control algorithm. FIG. 2F shows that the actual fluid flow measurement, because of the changing between the closed-loop and open-loop modes, tracks closely with the specified fluid flow set point shown on the y-axis at F. If operating in only the closed-loop mode, the actual flow would have diverged significantly from the fluid flow set point because of grossly over-compensated flow (similar to that shown in FIG. 2D) based on the unreliable and/or saturated measurements from the flow sensor as shown in FIG. 2C.

Although the embodiment illustrated in FIGS. 2A through 2F relates to a pressure increase, in several implementations, the multi-mode control algorithm is configured to change from the closed-loop mode to the open-loop mode when pressure decreases rapidly and causes a negative parasitic flow. A person of ordinary skill in the art will appreciate that the principles applied in FIGS. 2A through 2F are similarly applied to a scenario involving decreasing pressure.

Figure 3:
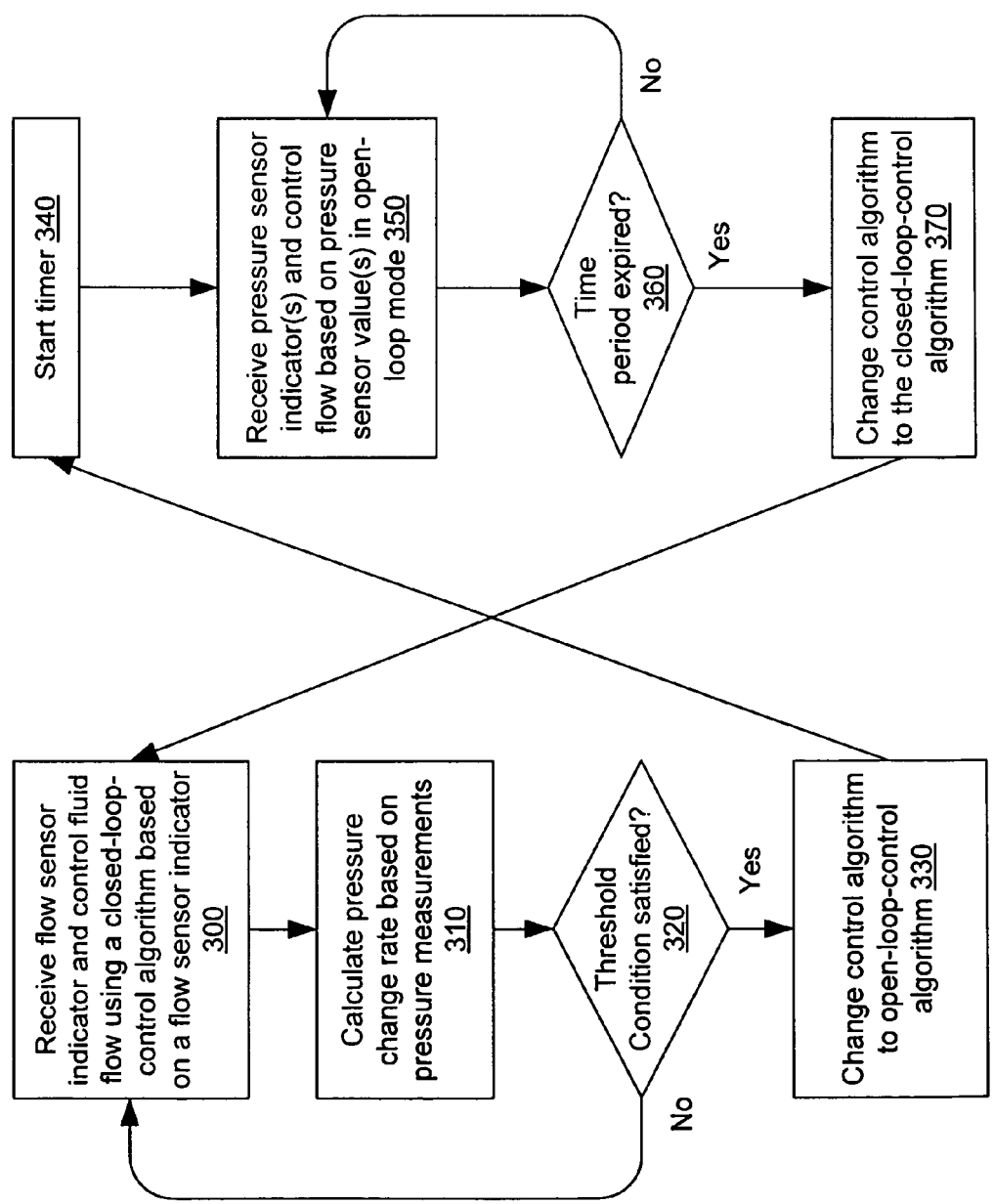
FIG. 3 is a flowchart that shows a method for modifying a multi-mode control algorithm, according to an embodiment of the invention.

FIG. 3 is a flowchart that shows a method for modifying a multi-mode control algorithm based on a defined pressure change threshold condition and based on a timer. In this embodiment, the threshold condition includes a pressure change rate value that, when exceeded by a pressure change rate, triggers a modification of the multi-mode control algorithm from the closed-loop mode to the open-loop mode. The pressure change rate is calculated using at least two pressure measurements from a pressure sensor and a corresponding measurement time that corresponds with each of the pressure measurements. In this embodiment the multi-mode control algorithm is modified from the open-loop mode back to the closed-loop mode when the timer expires.

As shown in FIG. 3, a flow sensor indicator indicating a fluid flow measurement is received and a flow of a fluid is controlled using a multi-mode control algorithm in the closed-loop mode based on the flow sensor indicator at 300. The fluid flow is controlled according to a fluid flow set point. As shown, a pressure change rate is calculated based on pressure measurements (e.g., difference between at least two pressure measurements over a specified period of time) at 310. If the pressure change rate does not exceed a defined pressure change threshold value at 320, the flow sensor indicators (i.e., flow sensor measurements) continue to be received and fluid flow continues to be controlled using the multi-mode control algorithm in the closed-loop mode at 300. The operations in blocks 300-320 are, in many embodiments, performed/executed concurrently or at substantially the same time.

When the calculated pressure change rate at 310 exceeds the pressure change threshold value at 320, the multi-mode control algorithm is modified from the closed-loop mode to the open-loop mode at 330 and the timer is started at 340. In this embodiment, the timer runs for a time period of 3 seconds. Pressure sensor indicators are received and fluid flow is controlled using the multi-mode control algorithm in the open-loop mode based on the pressure sensor indicators at 350 until the time period expires.

If the time period has not expired at 360 as determined by the timer, the pressure sensor indicator continues to be received and fluid flow is controlled based on the multi-mode control algorithm in the open-loop mode at 350. The fluid flow is controlled in the open-loop mode using a mathematical relationship (e.g., a flow/valve sensitivity curve). When the time period has expired at 360, the multi-mode control algorithm is modified from the open-loop mode back to the closed-loop mode at 370.

In some embodiments, the length of the time period depends on factors such as a response time of flow controllers or a deviation of pressure measurements above the corresponding threshold value. For example, in several embodiments, the time period used by the timer is extended and/or shortened when a pressure change within a specified period of time exceeds and/or falls below a threshold value by a specified amount. The time period of the timer, in yet other embodiments, is modified (e.g., extended or shortened) when a later pressure change or pressure change rate is detected after the timer has started.

In several embodiments, the multi-mode control algorithm is modified to one of several modes based on threshold conditions that correspond with each of the several modes. For example, if a first threshold condition is satisfied, the multi-mode control algorithm is changed to an open-loop mode that is different than if a second threshold condition would have been satisfied. In some implementations, a multi-mode control algorithm is changed from a first closed-loop mode to an open-loop mode and then to a second closed-loop mode. One or more threshold conditions are defined, in some embodiments, to use a combination of threshold conditions/values such as, for example, a pressure change rate value and a timer.

The multi-mode control algorithm, in several embodiments, is modified from a closed-loop mode to an open-loop mode according to a mathematical equation or rules-based algorithm so that the modification occurs, for example, at a slow rate rather than abruptly. In some embodiments, the rate of modification and/or level of modification (e.g., to one of several open-loop modes) of a multi-mode control algorithm from one mode to another depends on, for example, whether flow and/or pressure is increasing or decreasing. Also in other implementations, multi-mode control algorithm changes are triggered by pressure measurement values (e.g., threshold conditions based on a specified pressure measurement value) rather than changes in pressure measurement values or pressure change rates.

One or more sensor measurements in addition to or in place of a pressure measurement are, in some embodiments, used to determine whether a multi-mode control algorithm should be changed from a closed-loop mode to an open-loop mode. For example in several implementations, a flow sensor measurement and corresponding threshold condition(s) are used to determine when a multi-mode control algorithm should be changed from one more to another.

Figure 4:
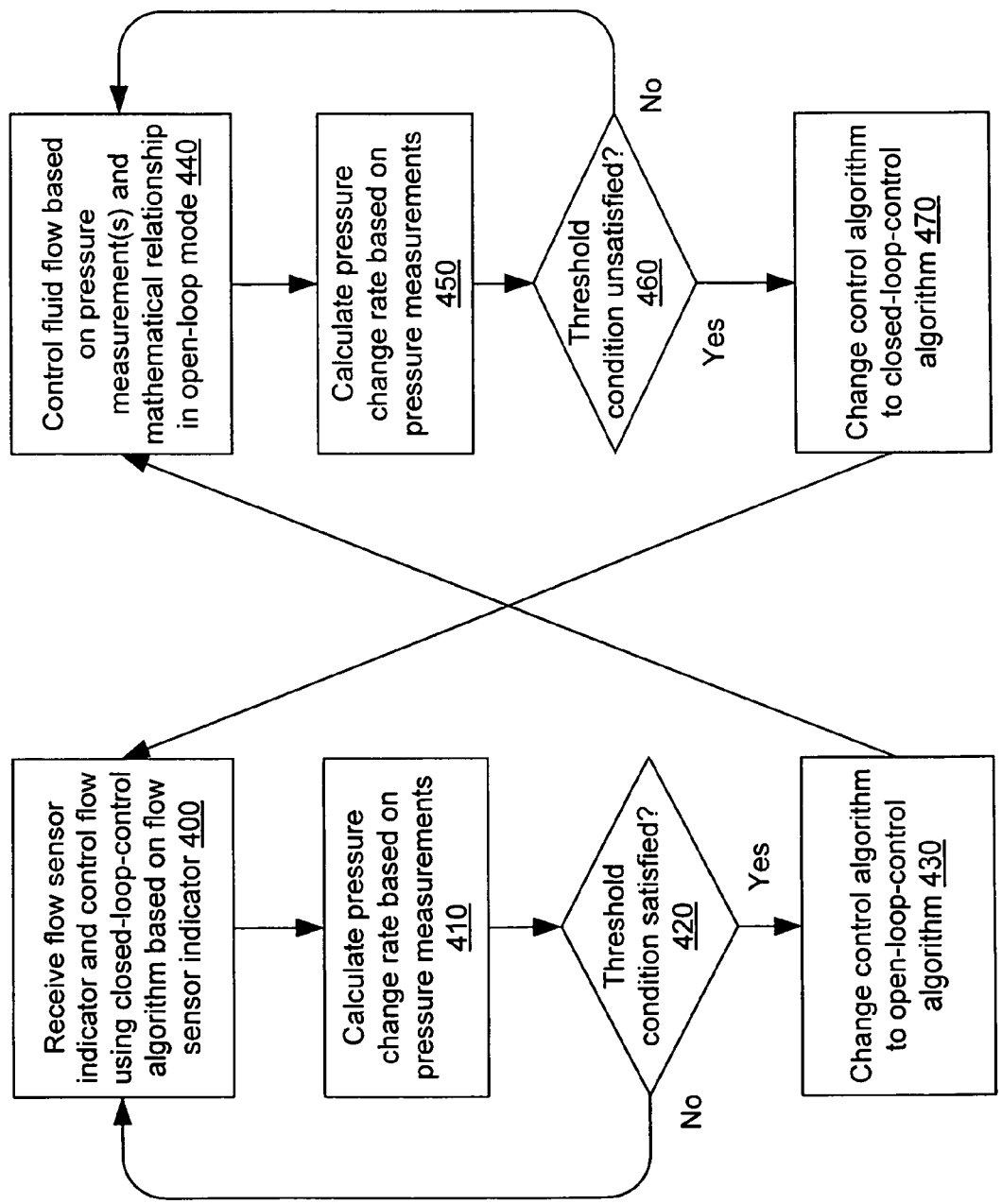
FIG. 4 is a flowchart that shows a method for modifying a multi-mode control algorithm, according to another embodiment of the invention.

Referring now to FIG. 4, it is a flowchart that shows a method for modifying a multi-mode control algorithm from a closed-loop mode to an open-loop mode based on a defined threshold condition. In this embodiment, the threshold condition is defined as a maximum pressure change rate that, when exceeded by a calculated pressure change rate, triggers a modification of the multi-mode control algorithm from the closed-loop mode to the open-loop mode. The pressure change rate is calculated as the magnitude of a pressure change over a specified period of time. At a later time when the pressure change rate falls below the threshold value (e.g., no longer satisfied), the multi-mode control algorithm is modified from the open-loop mode back to the closed-loop mode. Although in this embodiment, the change from the open-loop mode to the closed-loop mode is triggered by a pressure change rate, in other embodiments, the change is, in addition to the pressure change rate, dependent upon other measurements (e.g., temperature measurements and/or flow measurements).

As shown in FIG. 4, a flow sensor indicator indicating a fluid flow rate is received and a flow of a fluid is controlled according to a fluid flow set point using a multi-mode control algorithm in the closed-loop mode based on the flow sensor indicator at 400. As shown, a pressure change rate is calculated based on pressure measurements at 410. The pressure change rate is calculated as a difference between at least two pressure measurements over a specified period of time. If the pressure change rate does not exceed a defined pressure change threshold value at 420, the flow sensor indicator continues to be received and fluid flow continues to be controlled using the multi-mode closed-loop control algorithm in the closed-loop mode at 400. The operations in blocks 400-420 are, in many embodiments, performed/executed concurrently or at substantially the same time.

As shown in FIG. 4, when the calculated pressure change rate at 410 exceeds the threshold value at 420, the multi-mode control algorithm is modified from the closed-loop mode to the open-loop mode at 430. Once the multi-mode closed loop algorithm is modified to the open-loop mode, the fluid flow is controlled using the multi-mode control algorithm in the open-loop mode based on pressure measurement(s) and a mathematical relationship at 440. Pressure change rates are continuously (or intermittently in some embodiments) calculated at 450 based on pressure measurements received from a pressure sensor.

If calculated pressure change rates continue to exceed the threshold value at 460, pressure measurements continue to be received and fluid flow is controlled using the multi-mode control algorithm in the open-loop mode at 450. When the calculated pressure change rate at 450 falls below the threshold value at 460, the multi-mode control algorithm is modified from the open-loop mode back to the closed-loop mode at 470.

In several embodiments, multiple sensors (e.g., flow, temperature, and pressure sensors) are monitored with reference to corresponding threshold values to determine whether a multi-mode control algorithm should be modified from a closed-loop mode to an open-loop mode and vice versa. The values (i.e., parameters) within a threshold condition, in several implementations, are defined based on empirical data related to, for example, a specific flow controller(s).

In some embodiments, a first threshold value for modifying a multi-mode control algorithm from a closed-loop mode to an open-loop mode is different than a second threshold value used for determining whether to change the algorithm from the open-loop mode back to the closed-loop mode. In yet other embodiments, the threshold condition is based on a complex combination (e.g., subtracted, multiplied) of values (e.g., time, pressure, etc.) or boolean conditions (e.g., "or" boolean condition). For example, the threshold condition is only satisfied when the values and/or calculated values derived from both a temperature indicator and a pressure indicator exceed their respective corresponding threshold values.

One or more threshold conditions, in some multi-mode algorithms, are defined such that the multi-mode algorithm changes from one mode to another mode when measured and/or calculated values exceed or fall below the one or more threshold conditions. For example, the threshold pressure change rate value in a threshold condition is, in some embodiments, an absolute value and pressure change rates are calculated as absolute values.

In some applications, one or more threshold conditions are defined to accommodate narrow flow sensor ranges. For example, in a low-flow application using a low-flow flow sensor with a narrow flow sensor range, a threshold condition is defined to trigger a change of the multi-mode control algorithm to the open-loop mode with very small changes in pressure to prevent reliance by the closed-loop control algorithm on saturated flow measurements from the low-flow flow sensor.

A threshold condition is defined, in some embodiments for example, so that the multi-mode control algorithm is modified only if more than three consecutive pressure change rates exceed a threshold value. By defining the threshold condition in this manner, the multi-mode control algorithm is held in a specified mode, such as the closed-loop mode, before being modified to another mode, such as the open-loop mode.

In conclusion, the present invention provides a system and method for controlling a flow of a fluid using a multi-mode control algorithm. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A method, comprising:
   receiving a pressure measurement of a fluid generated by a pressure sensor;
   disengaging a feedback control loop responsive to a pressure change rate of the fluid satisfying a threshold condition;
   initiating a timer when the feedback control loop is disengaged;
   calculating a valve position to produce a fluid flow according to a specified fluid flow set point, the calculation of the valve position being based on the pressure measurement, and the calculated valve position being used to control a flow of the fluid while the feedback control loop is disengaged; and
   re-engaging the feedback control loop when a time period of the timer expires, the time period is defined based on the pressure change rate.

2. The method of claim 1, wherein the feedback control loop is configured to control the flow of the fluid according to the set point and based on a characteristic of the flow as provided by a sensor.

3. The method of claim 1, wherein the feedback control loop is configured to control the flow of the fluid using a flow sensor that senses the flow of the fluid, the threshold condition is defined based on a characteristic of the flow sensor.

4. The method of claim 1, wherein the feedback control loop is configured to control the flow of the fluid using a flow sensor that senses the flow of the fluid, the threshold condition is defined based on an operating range of the flow sensor.

5. The method of claim 1, wherein the calculating includes calculating the valve position based on at least one of calibration data or characterization data.

6. The method of claim 1, further comprising re-engaging the feedback control loop when at least one of the time period of the timer expires or the threshold condition changes from being satisfied to unsatisfied.

7. The method of claim 1, further comprising re-engaging the feedback control loop when the time period of the timer expires, the time period is defined based on a magnitude of the pressure change.

8. The method of claim 1, wherein the pressure change rate is calculated using at least two measurements each with a corresponding measurement time.

9. The method of claim 1, wherein the pressure measurement is a second pressure measurement at a second time,
   the method, further comprising detecting the pressure change of the fluid, the pressure change is a difference between a first pressure measurement at a first time and the second pressure measurement, the second time is after the first time.

10. The method of claim 1, including extending the time period responsive to the pressure change rate of the fluid satisfying the threshold condition during the time period.

11. A method, comprising:
    receiving at least one sensor indicator generated by a fluid flow characteristic sensor;
    modifying a multi-mode control algorithm from a closed-loop mode to an open-loop mode when, based on the at least one sensor indicator, a threshold condition is satisfied, the multi-mode control algorithm is used by a flow controller to control a flow of a fluid according to a set point;
    initiating a timer when the threshold condition is satisfied;
    calculating a valve position of a valve so as to deliver the fluid according to the set point when operating in the open-loop mode; and
    modifying the multi-mode control algorithm from the open-loop mode to the closed loop mode when a time period of the timer expires.

12. The method of claim 11, wherein calculating the valve position of a valve comprises, using the open-loop mode and using the at least one sensor indicator.

13. The method of claim 11, wherein calculating the valve position comprises using (i) the open-loop-control algorithm, (ii) the at least one sensor indicator, and (iii) a mathematical relationship.

14. The method of claim 11, wherein the fluid flow characteristic sensor is a pressure sensor, the at least one sensor indicator is a pressure sensor indicator.

15. The method of claim 11, wherein the fluid flow characteristic sensor is at least one of a flow sensor, a timer, a pressure sensor or a temperature sensor.

16. The method of claim 11, further comprising detecting a change in the sensor indicator, the threshold condition is satisfied by the change.

17. The method of claim 11, wherein the sensor indicator indicates a characteristic associated with the fluid.

18. The method of claim 11, wherein the closed-loop mode is configured to control the flow of the fluid using a flow sensor that senses the flow of the fluid, the threshold condition is defined based on at least one of a characteristic of the flow sensor or an operating range of the flow sensor.

19. The method of claim 11, further comprising modifying the control algorithm from the open-loop mode to the closed-loop mode when the threshold condition associated with the sensor indicator changes from being satisfied to unsatisfied.

20. The method of claim 11, wherein the threshold condition is a first threshold condition, the at least one sensor indicator is received at a first time; and the method further comprising modifying the control algorithm from the open-loop mode to the closed-loop mode when, based on a second sensor indicator received at a second time from the sensor, a second threshold condition is satisfied.

21. The method of claim 11, wherein the open-loop mode is selected from a set of open-loop modes in response to the threshold condition being satisfied.

22. An apparatus, comprising:
a processor configured to calculate a valve position based on a pressure measurement when a feedback control loop has been disengaged, the feedback control loop being disengaged when a pressure change of a fluid satisfies a threshold condition, a valve controls a flow of the fluid in response to the valve position, and the processor is configured to re-engage the feedback control loop when a time period after the threshold condition was satisfied expires; and
a memory configured to store a mathematical relationship between the valve position, the flow of the fluid, and the pressure measurement, the mathematical relationship is used by the processor to calculate the valve position.

23. The apparatus of claim 22, further comprising a memory that is configured to store the threshold condition, the processor is configured to access the threshold condition from the memory.

24. The apparatus of claim 22, wherein the feedback control loop is configured to control the flow of the fluid according to a set point and using a flow sensor that senses the flow of the fluid, the threshold condition is defined based on an operating range of the flow sensor.

25. The apparatus of claim 22, wherein the feedback control loop is re-engaged when at least one of a time period of a timer expires or the threshold condition changes from being satisfied to unsatisfied.

* * * * *